(12) United States Patent
Karjalainen

(10) Patent No.: US 11,083,046 B2
(45) Date of Patent: Aug. 3, 2021

(54) SYSTEM AND METHOD FOR SELECTING A BEAMFORMING CONFIGURATION

(71) Applicant: Samsung Electronics Co., Ltd., Suwon-si (KR)

(72) Inventor: Juha Karjalainen, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 881 days.

(21) Appl. No.: 14/991,168

(22) Filed: Jan. 8, 2016

(65) Prior Publication Data

US 2016/0204507 A1 Jul. 14, 2016

(30) Foreign Application Priority Data

Jan. 9, 2015 (GB) ..................................... 1500375

(51) Int. Cl.
*H04W 84/20* (2009.01)
*H04B 7/06* (2006.01)
*H04W 28/02* (2009.01)

(52) U.S. Cl.
CPC .......... *H04W 84/20* (2013.01); *H04B 7/0695* (2013.01); *H04W 28/0226* (2013.01)

(58) Field of Classification Search
CPC . H04W 84/20; H04W 28/0226; H04B 7/0695
See application file for complete search history.

(56) References Cited

U.S. PATENT DOCUMENTS

| 7,787,554 | B1  |   | 8/2010  | Nabar et al. |           |
|-----------|-----|---|---------|--------------|-----------|
| 2002/0147032 | A1 |   | 10/2002 | Yoon et al.  |           |
| 2010/0246476 | A1 | * | 9/2010  | Hethuin ................ | H04W 16/28 370/315 |
| 2013/0094440 | A1 | * | 4/2013  | Moshfeghi .......... | H04W 72/046 370/328 |

(Continued)

FOREIGN PATENT DOCUMENTS

WO 2011/099970 A1 8/2011

*Primary Examiner* — Erin F Heard
*Assistant Examiner* — Donald H B Braswell
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method and system for selecting a beamforming configuration for a first antenna array for communication with a second antenna array are provided. The first array is configurable according to a first plurality of configurations and is associated with a first terminal. The method and system are configured to identify a first subset of beamforming configurations from the first plurality of beamforming configurations wherein each of the first plurality of beamforming configurations is associated with a data value, and the identification comprises using information associated with the location of any one or more of the first or second arrays. The method and system are configured to select a first set of one or more data values associated with the one or more beamforming configurations in the first subset and select a beam forming configuration associated with at least one data value from the first set of data values.

19 Claims, 3 Drawing Sheets

(56) References Cited

U.S. PATENT DOCUMENTS

| | | | | |
|---|---|---|---|---|
| 2013/0163517 A1* | 6/2013 | Kotecha | ............... | H04B 7/0417 370/328 |
| 2015/0004918 A1* | 1/2015 | Wang | ................... | H04W 48/16 455/73 |
| 2015/0229375 A1* | 8/2015 | Vook | ................... | H04B 7/0469 370/329 |
| 2016/0118716 A1* | 4/2016 | Stephenne | ............... | H01Q 3/34 342/372 |

* cited by examiner

SYSTEM AND METHOD FOR SELECTING A BEAMFORMING CONFIGURATION

CROSS-REFERENCE TO RELATED APPLICATION(S)

This application claims the benefit under 35 U.S.C. § 119(a) of a U.K. patent application filed on Jan. 9, 2015 in the U.K. Intellectual Property Office and assigned Ser. No. 1500375.9, the entire disclosure of which is hereby incorporated by reference.

TECHNICAL FIELD

The present disclosure relates to the field of beamforming More particularly, the present disclosure relates to selecting a beamforming configuration for a first antenna array for communication with a second antenna array in a wireless communication system.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Cellular networks commonly use antenna arrays to establish communications between different devices of the network including between fixed base stations and mobile devices. It is common for such cellular networks to use beamforming antennas to reduce the amount of transmission power when communicating between two devices. By using large antenna arrays with beamforming, increases in the antenna gain, the array gain (signal to noise ratio (SNR) increase), and the diversity and directivity gain can typically be achieved.

Due to unfavorable propagation conditions in mm-wave radio channels, large antenna gains at both transmitter and receiver sides are required to overcome propagation losses. To achieve large antenna gains, very large scale antenna arrays are usually needed that enable highly directive transmit and receive beamforming. As a result of highly directive transmission and reception in mm-wave communication, the cell discovery becomes more challenging with respect to omni-directional transmission and reception e.g. in 3rd Generation Partnership Project (3GPP) long-term evolution-advanced (LTE-A) Release-12. More specifically, to detect/discover an eNodeB (eNB) in the proximity of a user equipment (UE), both the mm-wave transmitter and receiver need to align their transmission and reception beams with each other. Clearly, this is not a trivial task leading to an exhaustive combinatorial problem. In this exhaustive approach, all beam pairs are examined by sending a training packet for each beam pair. As a result, the discovery time becomes prohibitively long.

Beamforming is a technique used to configure antenna arrays so that the transmitting antennas transmit a focused and directed wavefront towards the intended receiving antenna array. Likewise, a receiving antenna array can be configured (i.e., use beamforming) to receive intended transmission signals from a focused direction. Beamforming techniques to drive transmitting antennas typically vary the phase and or amplitude of the electronic driving signals to establish the desired wavefront focusing. The wavefronts of the transmitted beamformed signals may take a variety of shapes wherein the more antennas there are in the array, the more complex the shape may become. Once the beamformed link has been established, communications can be established between the two devices having the antenna arrays with a high power and coverage efficiency.

Existing networks are known to perform beam discovery by transmitting, from the same antenna array, all of the possible beamformed signals and identify which of the signals was received with the greatest intensity be the receiving device. A large amount of processing power and time is required at the transmitting array if this process is done by simultaneously sending out all of the possible beamformed signal shapes. Alternatively, if the process performs beam discovery by sequentially sending out different beamformed signals then this can take a long time in comparison to network data rates. These factors can become an issue when implementing future networks.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system for selecting a beamforming configuration for a first antenna array for communication with a second antenna array in a wireless communication system.

In accordance with an aspect of the present disclosure, a method for selecting a beamforming configuration for a first antenna array for communication with a second antenna array in a wireless communication system, the first antenna array being configurable according to a first plurality of beamforming configurations, and associated with a first terminal is provided. The method includes identifying a first subset of one or more beamforming configurations from the first plurality of beamforming configurations, wherein each of the first plurality of beamforming configurations is associated with a data value, and the identifying including using information associated with the location of any one or more of the first or second antenna arrays, selecting a first set of one or more data values associated with the one or more beamforming configurations in the first subset, selecting a beam forming configuration associated with at least one data value from the first set of data values, configuring, using the first terminal, the first antenna array in accordance with the selected beam forming configuration.

The first aspect may be modified in any suitable way as disclosed herein including but not limited to any one or more of the following.

The method may include transmitting, using the first antenna array in the selected beamforming configuration, a signal to the second antenna array, the second antenna array being associated with a second terminal.

The method may be configured such that the second antenna array is configurable in a second plurality of beamforming configurations, the method may further include identifying a second subset of one or more beamforming configurations from the second plurality of beamforming configurations.

According to an aspect of the present disclosure, each of the second plurality of beamforming configurations may be associated with a data value, the identifying including using information associated with the location of any one or more of the first or second antenna arrays, selecting a second set of one or more data values associated with the one or more beamforming configurations in the second subset, selecting a beam forming configuration associated with at least one data value from the second set of data values, and configuring, using the second terminal, the second antenna array in accordance with the selected beam forming configuration.

The method may include selecting the first set of data values using a third terminal, transmitting the first set of data values to the first terminal using a first transmission apparatus, and selecting the beamforming configuration using the first terminal.

According to an aspect of the present disclosure, the first transmission apparatus may be configured to transmit the first set of data values using a wired transmission medium.

The method may include selecting the second set of data values using a third terminal, transmitting the second set of data values to the second terminal using a second transmission apparatus, and selecting the beamforming configuration using the second terminal.

According to an aspect of the present disclosure, the second transmission apparatus may be configured to transmit the second set of data values using a wireless transmission medium.

According to an aspect of the present disclosure, the second transmission apparatus may be configured to transmit the second set of data values using a radio waves.

According to an aspect of the present disclosure, the information associated with the location of any one or more of the first or second antenna arrays may include any one or more of position information associated with the first antenna array, or, position information associated with the second antenna array.

The method may include generating the information using any one or more of data derived from the triangulation of the second antenna array using a plurality of first antenna arrays, or GPS data associated with the position of the second antenna array.

According to an aspect of the present disclosure, the first antenna array and first terminal may include a cell base station.

According to an aspect of the present disclosure, the network may include a plurality of first antenna arrays, each in communication with an associated first terminal.

The method may include, for each of the first antenna arrays, identifying a subset of one or more beamforming configurations, selecting a first set of data values associated with the one or more identified beamforming configurations, selecting a beam forming configuration associated with at least one data value, and configuring, using the associated first terminal, the said first antenna array in accordance with the selected beam forming configuration.

The method may include selecting each of the first sets of data values using the third terminal, and transmitting the first sets of data values to the associated first terminals using a first transmission apparatus.

According to an aspect of the present disclosure, the network includes a plurality of second antenna arrays, each in communication with an associated second terminal.

The method may include, for each of the second antenna arrays, identifying a subset of one or more beamforming configurations, selecting a second set of one or more data values associated with the one or more beamforming configurations, selecting a beam forming configuration associated with at least one data value, and configuring, using the associated second terminal, the said second antenna array in accordance with the selected beam forming configuration.

The method may include selecting or generating each of the second sets of data values using the third terminal, and transmitting the second sets of data values to the associated second terminals using a second transmission apparatus.

According to an aspect of the present disclosure, the second terminal may be a mobile communication device.

According to an aspect of the present disclosure, the mobile communication device may include the second antenna array, and an apparatus for receiving and processing data value sets transmitted by the third terminal, and communicating electronic signals to the second antenna array.

According to an aspect of the present disclosure, the first terminal may include an apparatus for receiving and processing data value sets transmitted by the third terminal, and for communicating electronic signals to the first antenna array.

According to another aspect of the present disclosure, a computer readable medium comprising computer readable code configured to give effect to the method as described in the first aspect is provided.

In accordance with another aspect of the present disclosure, a system for selecting a beamforming configuration for a first antenna array for communication with a second antenna array in a wireless communication system is provided. The system includes the first antenna array, wherein the first antenna array is configurable according to a first plurality of beamforming configurations, and a first terminal associated with, and adapted to configure, the first antenna array in accordance to one or more beamforming configurations, and a processor configured to identify a first subset of one or more beamforming configurations from the first plurality of beamforming configurations, wherein each of the first plurality of beamforming configurations is associated with a data value, the identifying may include using information associated with the location of any one or more of the first or second antenna arrays, select a first set of one or more data values associated with the one or more beamforming configurations in the first subset, wherein the first terminal is further configured to select a beam forming configuration associated with at least one data value from the first set of data values, and configure the first antenna array in accordance with the selected beam forming configuration.

The second aspect may be modified in any suitable way as disclosed herein including but not limited to any one or more of the following.

The system may include a third terminal, the third terminal comprising the said processor.

The system may be configured such that the second antenna array is configurable in a second plurality of beamforming configurations, the processor may be further configured to identify a second subset of one or more beamforming configurations from the second plurality of beamforming configurations, wherein each of the second plurality of beamforming configurations is associated with a data value, the identification may include using information associated with the location of any one or more of the first or second antenna arrays, and select a second set of one or more data values associated with the one or more beamforming configurations in the second subset.

The system may be configured such that the processor is configured to select the first set of data values, and transmit the first set of data values to the first terminal using a first transmission apparatus.

The system may be configured such that the first transmission apparatus is configured to transmit the first set of data values using a wired transmission medium.

The system may be configured such that the processor is configured to select the second set of data values, and transmit the second set of data values to the second terminal using a second transmission apparatus.

The system may be configured such that the second transmission apparatus is configured to transmit the second set of data values using a wireless transmission medium.

The system may be configured such that the second transmission apparatus is configured to transmit the second set of data values using radio waves.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

There is presented herein a method and system for selecting a beamforming configuration for a first antenna array for communication with a second antenna array within a cellular network.

Figure 1:
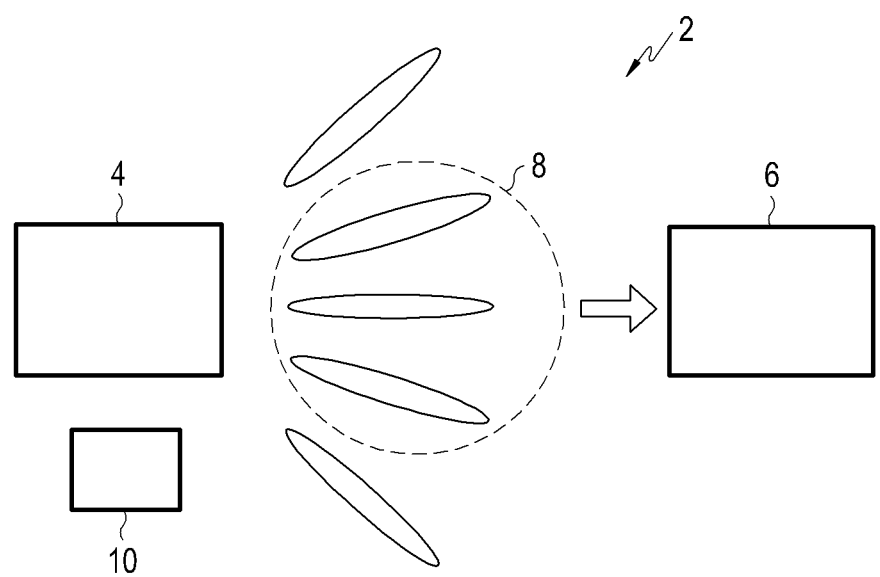
FIG. 1 is a schematic diagram showing features of a method and a system for selecting a beamforming configuration as described herein according to an embodiment of the present disclosure.

FIG. 1 is a schematic diagram showing features of a method and a system for selecting a beamforming configuration as described herein according to an embodiment of the present disclosure.

Referring to FIG. 1, a first antenna array 4 is configurable according to a first plurality of beamforming configurations. A first terminal 10 is provided that is associated with the first antenna array 4. A processor is also provided that is configured to identify a first subset 8 of one or more beamforming configurations from the first plurality of beamforming configurations. Each of the first plurality of beamforming configurations is associated with a data value. The identification of the first subset 8 uses information associated with the location of any one or more of the first antenna array 4 or a second antenna array 6. The processor is also configured to select a first set of one or more data values associated with the one or more beamforming configurations in the first subset.

The first terminal 10 is further configured to select a beam forming configuration associated with at least one data value from the first set of data values. The first terminal 10 is further configured to configure the first antenna array 4 in accordance with the selected beam forming configuration.

When reference is made to 'configuring an antenna array', it is intended to mean to impart the correct driving signals (phase and amplitude) to the different antenna elements contributing to the beamformed transmission. Likewise, an array configured according to a beamformed configuration, for receiving a transmitted beamformed signal, has its associated connected electronic detection components set up to optimally accept incoming signals according to a particular beamformed signal.

The system and method therefore provides the first antenna array 4 and the second antenna array 6 with a reduced number of beamformed signals to transmit (or receive) during the beam discovery process which, in turn, reduces the power required and/or time taken for beam discovery. For example, the first plurality of beamformed configurations may be the entire number of possible beamforming wavefront shapes available by utilizing all of the antennas in the array. The number of available configurations that the first terminal 10 can drive the first array 4 with may be large, for example over ten configurations. By only considering the subset 8 of beamform shapes, the first terminal 10 may drive the first array 4 to transmit ten or fewer beamformed configurations which significantly lowers the energy and/or time resources needed for beamform discovery.

The system 2 uses information associated with the location of any one or more of the first antenna array 4 or the second antenna array 6 to select candidate beamforming shapes for the beam discovery process that are more likely to result in the optimal beamforming array configuration. The location information is preferably used in a process that compares the directionality of the beamformed signal emanating from the transmitter array 4 with one or more expected positions of the second antenna array 6 gained from the position information. Examples of information include, but are not limited to, GPS data associated with any one or more of the first antenna array 4 or the second 6 antenna array, positional information of the first antenna array 4 or the second antenna array 6, etc. The positional information could be the surface location of a fixed transmitter such as a base cell transmitter. The positional information could be active real-time information (i.e., positional data about the array that changes in time), such as positional information associated with a mobile terminal (e.g., mobile terminal 12 of FIG. 2). Such information may be ascertained from triangulating a mobile terminal's position within a network using multiple arrays in a spaced apart configuration.

The positional information may also include the vertical (height) information of the array (i.e. how far an array is off the ground or its vertical extent above or below a certain height level). The information may be generated or provided to the processor by any suitable means including by a wired or wireless transmission.

Other information may also be used such as a map showing obstructions near to the transmitting and/or receiving array that would cause the processor to select candidate beamforming shapes 8 that were minimally affected by such obstructions.

The beamforming configuration subset 8 can comprise one or a plurality of candidate beamforming configurations 8, but has a smaller number of configurations than the full number available from the first plurality of available beamforming configurations. Having each beamforming configuration for a particular array associated with a specific data value allows the processor and the device (or terminal) that electronically configures the array to share a set of common values.

If, for example, the terminal electronically operating the array and the processor were physically separated but in communication with each other, then the data value or code selected by the processor can be sent to the terminal for configuring the array to the desired beamformed shape. For example, each data value may be a small value such as a short code (such as an index) that is distinguishable from the other data values representing the other beamformed configurations. Using a small data value to represent a more complex set of instructions for configuring an array allows the beamformed configuration data to be sent efficiently over wired or wireless networks. The device or terminal associated with the processor may therefore share a common list of predetermined values, codes or a 'codebook' with the terminal 10, 12 respectively associated with the antenna array 4, 6. If the processor terminal serves multiple arrays, then the terminal may store multiple lists or codebooks, one for each array.

The processor may be any processor that can operate on electronic or optical signals and output signals to transmission means. The processor may in principle be located in any of the terminal devices (e.g., terminal devices 10, 12, 14 of FIG. 2) described herein and may comprise a plurality of processors. For example, the processor may be located remotely from the first terminal 10 and any second terminal 12 equipment associated with the first antenna array 4 or the second antenna array 6.

The cellular network may in principle be any type of cellular network operating using any one or more communication standards and/or communication base frequencies and/or data rates. For example, the cellular network may consist of millimeter wave (mm-wave) first terminals 4 such as those used in small cells (such as cell base stations) and may be deployed in the presence of a macro overlaid network (that is used to at least communicate with the second terminals 12), e.g. long term evolution-Advanced (LTE-A). The deployed mm-wave small cells (having first antenna arrays 4) are assumed to operate on different frequency bands with respect to the overlaid macro network. For example, the mm wave (base) frequencies used by the first arrays 4 and controlled by the first terminals 10 may be between 6 and 100 GHz. For example, the mm wave (base) frequencies used by the third terminal 14 (described later on) to communicate with the second terminals 12 (i.e. the macro overlaid network) may be between 1 and 6 GHz.

The first antenna array 4 and the second antenna array 6 may be any type and design of antenna array and may comprise two or more antennas that are operated (by a terminal device 10, 12) cooperatively to establish different beamforming configurations. For example, at least one of the antenna arrays (for example the first array 4) may be an array on a cell base station. Such an array 4 may comprise between 10-1000 antennas. For example, at least one of the antenna arrays (for example the second array 6) may be an array within or in communication with a mobile terminal device 12, such as but not limited to, a mobile phone. Such an array 6 may comprise between 10-200 antennas. For example, the antennas may be configured to transmit and/or receive millimeter (mm) waves.

The terminals 10, 12, 14 described herein may comprise a processor for processing information (for example the processor described above) and a memory device for storing information and at least one transmission apparatus (e.g., 4, 6, 16, 18, 20, etc.) for transmitting data to other devices such as other terminals 10, 12, 14. An example of a preferred terminal used herein is an eNodeB terminal.

Figure 2:
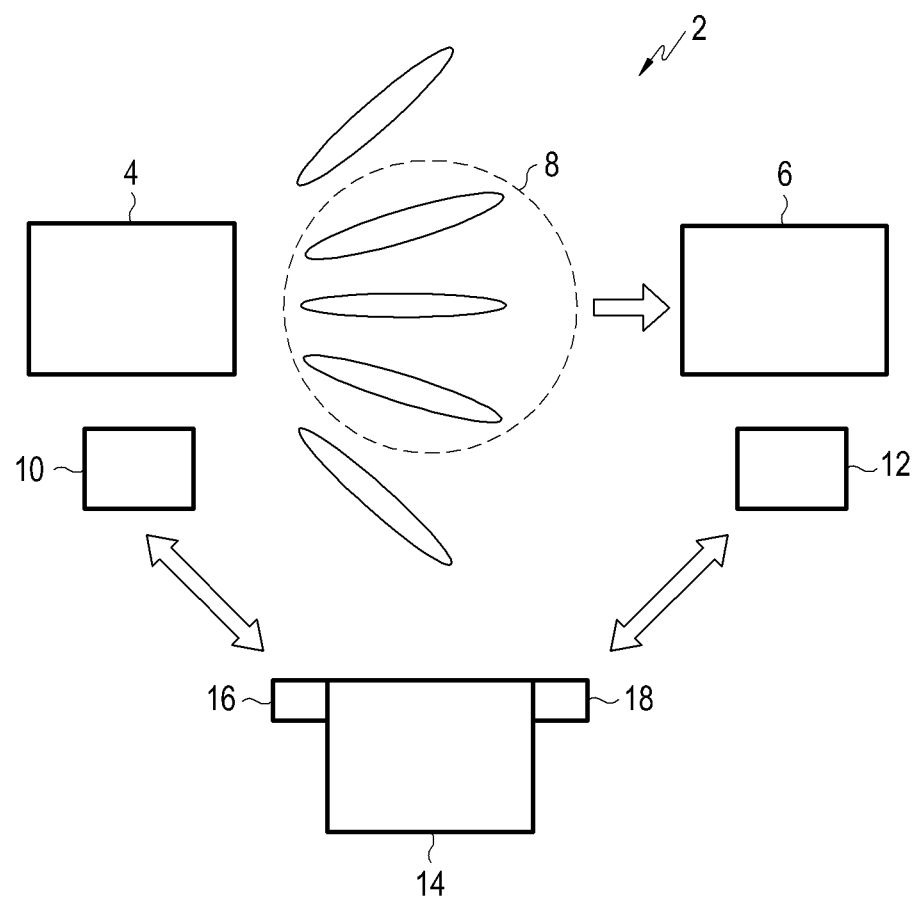
FIG. 2 is a schematic diagram showing features of an example method and system for selecting a beamforming configuration as described herein according to an embodiment of the present disclosure.

FIG. 2 is a schematic diagram showing features of an example method and system for selecting a beamforming configuration as described herein according to an embodiment of the present disclosure.

Referring to FIG. 2, in this example the second array 6 is associated with a second terminal 12. This example can be modified according to any of the variations and options for features and components described herein. In this example, the first array 4 is preferably located at a cell base station and the second array 6 is located within a mobile device 12, although in principle any two arrays and associated terminals may be used. The processor is housed within a third terminal 14 that is physically remote from the first terminal 10 and the second 12 terminal.

In this example, the third terminal 14 selects the first set of data values and transmits the first set of data values to the first terminal 10 using a first transmission apparatus 16. For example, the first transmission apparatus 16 is configured to transmit the first set of data values using a wired transmission medium (e.g., medium 22 in FIG. 3). This may be a backhaul network transmission channel that connects between static arrays/terminals 4, 10 such as base stations.

Upon receiving the first set of data values, the first terminal 10 may select one, more than one or all of the beamformed signals in the subset for driving the first antenna array 4. This may be accomplished by comparing each data value (received from the third terminal 14) to a predetermined list of values corresponding to the beamformed configurations.

A similar process may be undertaken for sending values to the second terminal 12 wherein the third terminal 14 selects the second set of data values and transmits the second set of data values to the second terminal 12 using a second transmission apparatus 18. The second terminal 12 then selects one or more of the beamforming configuration represented by the received values. For example, the second transmission apparatus 18 may be configured to transmit the second set of data values using a wireless transmission medium. This medium may include radio waves at a different base frequency than that used by the antenna arrays 4, 6.

The dual connectivity of a) the second array 6 to the first array 4, and b) the second terminal 12 to the third terminal 14, (each connection using a different transmission medium and/or frequency range) allows the network to establish further functionality as described herein without using up bandwidth of the main connection between the first and second antenna arrays 4, 6.

In an implementation, the first terminal 10 comprises an apparatus, such as an electronic or optical receiver, configured to receive data transmitted by the third terminal 14. For example, the second terminal 12 comprises apparatus 20 for communicating with the third terminal 14 and receiving data values from the third terminal 14. An example of such apparatus 20 is an LTE-A radio.

In an implementation of the system 2 and method, the second (mobile) terminal 12 is provided with the list of data values corresponding to the first plurality of beamforming configurations associated with the first array 4. Each data value in the list provided may be accompanied by or include data that the second terminal 12 can use to determine whether or not it has received a signal from the first terminal/array 4, 10 using a particular beamformed shape. This data can be provided to the second terminal 12 using any transmission means or at any time prior to the first array 4 sending the beamformed signals to establish beam discovery.

In such an implementation, the first terminal 10 would drive the first array 4 to output signals according to the first subset 8 of selected beamformed configurations (for example three beamformed configurations have been selected and thus output by the first array 4). For example, all the selected beamformed configurations are output simultaneously by the first antenna array 4. The second (mobile) terminal 12 may be synchronized with the first terminal 10 (for example using synchronization signals sent to the mobile device 12 from any of the first 10 or third 14 terminals). This synchronization allows the second terminal 12 to configure the second array 6 with the second subset of selected beamformed signals at the same time as the first terminal 10 configures the first antenna array 4 with the first subset 8 of selected beamformed signals. The selected beamformed configurations for the second antenna array 6 are preferably output simultaneously in synchronization with the output of the beamformed signals from the first antenna array 4.

The second terminal 12 analyzes, using its processor, which pair of first and second array beamformed configurations provide the optimum (e.g., most intense) signal throughput. This may be accomplished by, for example, having different sequences of data sent in each first array beamformed configuration, hence allowing the second terminal 12 to differentiate between them. The second terminal 12 can then send to the third terminal 14 at least the data value corresponding to the optimum beamformed signal of the first antenna array 4. This can be done using any means of communication including the same transmission means 20 used to convey the data values from the third terminal 14 to the second terminal 12. The third terminal 14 can then send the same optimum data value to the first terminal 10. Upon receiving the data associated with the optimum beamformed configuration for the first antenna array 4, the first terminal 10 then only drives the first array 4 uses the optimum beamformed configuration.

EXAMPLE

Figure 3:
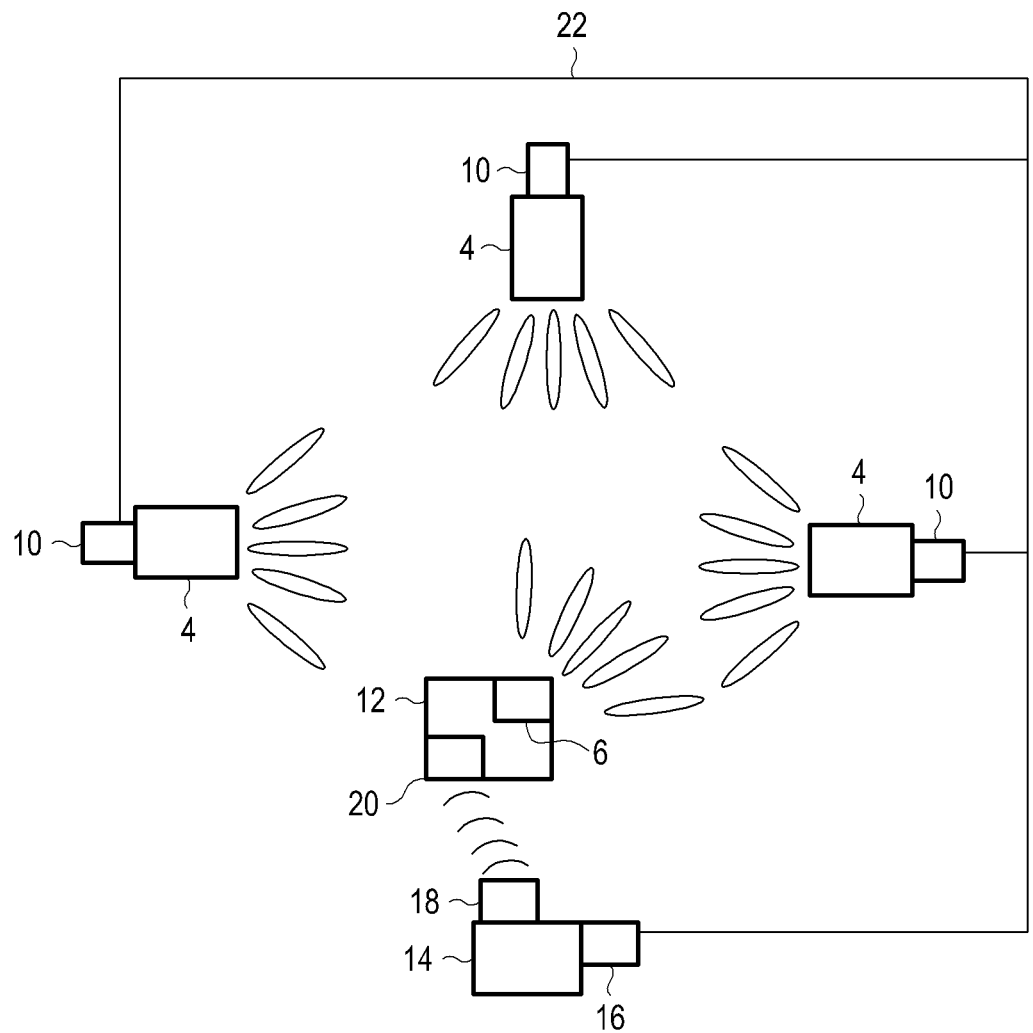
FIG. 3 shows an example implementation of a system described herein according to an embodiment of the present disclosure.

Any of the above examples can be implemented into a cellular network comprising a plurality of first antenna 4 and associated first terminals 10. FIG. 3 shows an example implementation of a system described herein according to an embodiment of the present disclosure.

Referring to FIG. 3, the plurality of first antenna 4 and terminals 10 may include a plurality of cell base stations with associated terminal hardware such as, but not limited to an eNodeB 10. Each eNodeB 10 is connected via a wired backhaul 22 network to the third terminal 14. The third terminal 14 is this example may include a further eNodeB terminal equipment that may be called a macro eNodeB. The third terminal 14 is connected to the first terminals 10 via the wired backhaul 22 using the transmission/receiving apparatus 16.

The third terminal 14 in any of the examples of the method and system 2 described herein may also be connected to other parts of the cellular network or other networks via one or more wireless or wired communication channels.

The third terminal 14 also has hardware 18 to wirelessly communicate to a plurality of second terminals 12 in the network. For example, these second terminals 12 may be mobile terminal devices such as a mobile phone. The mobile terminal devices 12 each may have a second antenna array 6 for communicating with the first arrays 4 and hence first terminals 10. The mobile terminals 12 may further have transceiver hardware 20 and associated controlling software/firmware to communicate with the third terminal 14. An example of this transceiver hardware 20 is a radio, for example an LTE-A radio.

The third terminal 14 has a processor, one or more memory elements and/or any other computer readable medium containing computer readable instructions, and any other associated electronic, optoelectronic or optical hardware (such as but not limited to optical or electrical receivers, transmitters, transceivers) to perform the method as described herein. The memory elements of the third terminal 14 at least contain instructions to operate the third terminal as described herein. The memory elements further comprise data values associated with the beamforming configurations, at least for each of the first antennas 4 in the cluster supported by the third terminal 14. The data values may be stored on a database or otherwise as a codebook or code list.

The third terminal 14 may also be configured to store the data values corresponding to the second terminal 12 arrays 6 in the network. These may be pre-loaded into the memory elements of the third terminal 14 or transmitted to the third terminal 14 (by a second terminal 12 or via another source such as another network management terminal) when the second (mobile) terminal 12 enters the geographical coverage of the cluster of first arrays 4 managed by the third terminal 14.

The beamforming discovery process in the example shown in FIG. 3 and described above is similar to that described elsewhere herein. For example, the third terminal 14 may use location based information and compare this information with the beamforming configurations of the first antenna array 4 and the second antenna array 6 to establish the candidate beamforming configurations. After establishing an optimized subset 8 of the beamforming configurations, the third terminal 14 analyses the appropriate codebook to establish and select the appropriate data value/s to send to the first 10 and second terminals 12 respectively via the wired 22 and wireless communication means described above.

Further configuration options.

Any of the above described systems 2 and methods may be modified or adapted to use any of the following concepts described below.

The first arrays 4 (controlled by the first terminals 10) may operate by periodically sending out beam discovery signals that a second array 6 (controlled by a second terminal 12) can attempt to receive. This periodic sending may be controlled by the first terminal 10 and synchronized with the second terminals 12. The synchronization may be achieved either directly between first terminals 10 and second terminals 12, and/or via the third terminal 14 by sending synchronization signals to the first 10 and second 12 terminals using the aforementioned communication means (e.g. using the wired backhaul 22 for communication to/from the first terminals 10, and a radio apparatus 18, such as an LTE-A radio for communication to/from the second terminals 12).

The third terminal 14 may utilize the position information to select which one or more of the first terminals 10 that it manages (for example which of the fixed cell base stations in a cluster) to use to send out periodic beam discovery signals to the second terminals 12 (via the associated arrays 4, 6) within the network. For example, if the third terminal 14 manages a cluster of six first terminal base stations with six antenna arrays, then the third terminal 14 may use the position information to only choose two of these six base stations.

Once the said choice of first terminals 10 have been selected, the third terminal 14 may only convey instructions to initiate beam discovery (e.g. via the sending of beamforming data values) to the said selected terminals 10. This information/data may be transmitted by any means including the aforementioned wired backhaul network 22.

The third terminal 14 may perform this choice in addition to selecting the subset of available beamforming configurations for each of the chosen base stations (first terminal 10/array 4).

The third terminal 14 may also select which of the first terminals 10 to initiate beam discovery with by examining network load through the first terminals 10 and/or the compatibility of achieving the desired data transmission between a specific first terminal 10 and the target second mobile terminal 12. For example, the nearest first terminal 10 to a second (mobile) terminal 12 may already be providing high data rate communications to several other second terminals 12 whereas the second nearest first terminal 10 to the target second (mobile) terminal 12 may have less network load. Therefore, the third terminal 14 may not send any data to the nearest first terminal 10, but only sends data to the next nearest first terminal 10. The system 2 or method may therefore take into account load balancing issues.

Once a third terminal 14 has decided which one or more first terminals 10 to send beamforming data values to for beam discovery with a target second terminal 12 (and which subset of beamforming configurations to use), it may then send data to the target second terminal 12 to let the second terminal 12 know which first terminals 10 have been selected for beam discovery and what beamformed configurations they will be transmitting (and preferably when). Upon receipt of the first terminal data, the second terminal 12 can then choose which beamforming configurations it takes for its associated second antenna array 6 in order to successfully create an aligned beam pair with a first terminal 10 and its associated antenna array 4. Additionally or alternatively, this analysis and determination of the beamforming configurations to be used by second antenna array 6 may be calculated by the third terminal 14 and sent to the second (mobile) terminal 12. Such information may be sent along with other data such as data synchronizing the beam discovery procedure (e.g. the periodic configuration of the respective antenna arrays 4, 6 to transmit and receive a beamformed signal) between the selected first 10 and target second 12 terminals.

The general selection of first terminals 10 to use for beam discovery, plus the aforementioned reduction in beam discovery antenna configurations to a candidate subset 8 means less mm wave radio transmissions (between first and second terminals) are required to operate the network. This has an effect of reducing the electrical processing power required in the network and also helps to minimize unwanted interference between the multiple radio waves being transmitted in the network.

This example and any of the other systems 2 and methods described herein may utilize any suitable component, method operation or feature configuration option described elsewhere herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for selecting a beamforming configuration for a first antenna array for communication with a second antenna array in a wireless communication system, the method comprising:

identifying, by an electronic device including a third antenna array different from the first antenna array and the second antenna array, a first beamforming configuration subset from a plurality of first beamforming configurations configurable in the first antenna array based on information comprising global positioning system (GPS) data associated with a location of the first antenna array, wherein the first antenna array is included in a first device, the second antenna array is included in a second device, and each of the plurality of first beamforming configurations is associated with a different data value;

selecting, by the electronic device, a data value associated with each beamforming configuration included in the first beamforming configuration subset;

transmitting, to the first device by the electronic device, instructions to perform beam discovery with the second antenna array based on the data value associated with each beamforming configuration included in the first beamforming configuration subset;

transmitting, to the second device by the electronic device, a signal based on the first beamforming configuration subset;

identifying, by the electronic device, a second beamforming configuration subset from the plurality of second beamforming configurations based on information comprising the GPS data associated with a location of the first antenna array, wherein each of the plurality of second beamforming configurations is associated with a different data value; and selecting, by the electronic device, a data value associated with each beamforming configuration included in the second beamforming configuration subset based on the first beamforming configuration subset, wherein the second antenna array is capable of being configured in a plurality of second beamforming configurations, and wherein the transmitting of the signal based on the first beamforming configuration subset comprises transmitting, to the second device by the electronic device, instructions to perform beam discovery with the first antenna array based on the data value associated with each beamforming configuration included in the second beamforming configuration subset.

2. The method of claim 1, wherein the transmitting of the instructions to perform the beam discovery comprises transmitting the instructions to perform the beam discovery using a first transmission connectivity technique.

3. The method of claim 2, wherein the first transmission connectivity technique uses a wired transmission medium.

4. The method of claim 1,
wherein the transmitting of the instructions to perform the beam discovery to the first device comprises transmitting the instructions to perform the beam discovery using a first transmission connectivity technique, and
wherein the transmitting of the instructions to perform beam discovery to the second device comprises transmitting the instructions to perform the beam discovery using a second transmission connectivity technique different from the first transmission connectivity technique.

5. The method of claim 4, wherein the second transmission connectivity technique uses a wireless transmission medium.

6. The method of claim 5, wherein the wireless transmission medium uses radio waves.

7. The method of claim 1, wherein the information comprising the GPS data associated with the location of the first antenna array comprises any one or more of:
position information comprising GPS data associated with the first antenna array.

8. The method of claim 1, further comprising:
generating the information associated with the location of the first antenna array using any one or more of data derived from a triangulation of the second antenna array using a plurality of cell base station antenna arrays.

9. The method of claim 1, wherein a first cell base station comprises the first antenna array.

10. The method of claim 9,
wherein the first cell base station is in communication with a network,
wherein the network comprises a plurality of cell base stations, and
wherein the first cell base station is configured to communicate with the plurality of cell base stations.

11. The method of claim 1, wherein the second device comprises a mobile communication device.

12. The method of claim 11, further comprising:
receiving, by the electronic device from the mobile communication device, information based on the first beamforming configuration subset in response to the mobile communication device receiving signals from the first antenna array during the beam discovery.

13. The method of claim 1, further comprising:
receiving, by the electronic device from the first device, information based on the second beamforming configuration subset in response to performing the beam discovery with the second antenna array.

14. An electronic device for selecting a beamforming configuration for a first antenna array for communication with a second antenna array in a wireless communication system, the electronic device comprising:
a third antenna array different from the first antenna array and the second antenna array; and
at least one processor configured to:
identify a first beamforming configuration subset from a plurality of first beamforming configurations configurable in the first antenna array based on information comprising global positioning system (GPS) data associated with a location of the first antenna array, the first antenna array is included in a first device, the second antenna array is included in a second device, and each of the plurality of first beamforming configurations being associated with a different data value,
select a data value associated with each beamforming configuration included in the first beamforming configuration subset,
transmit, to the first device, instructions to perform beam discovery with the second antenna array based on the data value associated with each beamforming configuration included in the first beamforming configuration subset,
identify a second beamforming configuration subset from the plurality of second beamforming configurations based on information comprising the GPS data associated with a location of the first antenna array, wherein each of the plurality of second beamforming configurations is associated with a different data value,
select a data value associated with each beamforming configuration included in the second beamforming configuration subset based on the first beamforming configuration subset, and
transmit, to the second device, instructions to perform beam discovery with the first antenna array based on the data value associated with each beamforming configuration included in the second beamforming configuration subset,
wherein the second antenna array is capable of being configured in a plurality of second beamforming configurations.

15. The electronic device of claim 14, wherein, to transmit the instructions to perform the beam discovery, the at least one processor is further configured to:

transmit the instructions to perform the beam discovery using a first transmission connectivity technique.

16. The electronic device of claim 15, wherein the first transmission connectivity technique uses a wired transmission medium.

17. The electronic device of claim 14,
wherein, to transmit the instructions to perform the beam discovery, the processor is further configured to:
transmit the instructions to perform the beam discovery using a first transmission connectivity technique, and
transmit the instructions to perform the beam discovery using a second transmission connectivity technique different from the first transmission connectivity technique.

18. The electronic device of claim 17,
wherein the first transmission connectivity technique uses a wired transmission medium, and
wherein the second transmission connectivity technique uses a wireless transmission medium.

19. The electronic device of claim 18, wherein the wireless transmission medium uses radio waves.

\* \* \* \* \*